United States Patent Office 3,773,785
Patented Nov. 20, 1973

3,773,785
1-ALKYL-5-ALKYLAMINO-INDOLINES
Robert E. Manning, Mountain Lakes, N.J., assignor to Sandoz-Wander, Inc., Hanover, N.J.
No Drawing. Continuation-in-part of abandoned application Ser. No. 82,093, Oct. 19, 1970. This application Sept. 28, 1972, Ser. No. 184,625
Int. Cl. C07d 27/38
U.S. Cl. 260—326.11 R    14 Claims

ABSTRACT OF THE DISCLOSURE 1-alkyl-5-alkylamino-indolines, e.g., 1-octyl-5-(2-octylamino)-indoline, are prepared by reducing 1-alkanoyl-5-alkylamino-indolines or by the reductive alkylation of 5-amino-indoline with 2-heptanone and are useful as hypolipidemic agents.

---

The application is a continuation-in-part of copending U.S. patent application Ser. No. 82,093, filed Oct. 19, 1970, now abandoned.

This invention relates to derivatives of indoline, their preparation and to intermediates used in their preparation. In particular, this invention relates to 1-alkyl-5-alkylamino-indolines and their use as hypolipidemic agents.

The compounds of this invention may be represented by the formula

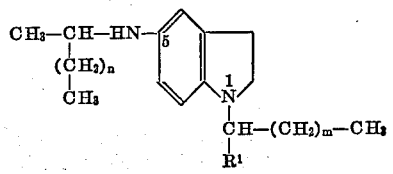

(I)

where $m$ and $n$ each independently is 4, 5, 6, 7, or 8, and
$R^1$ represents hydrogen or methyl, and pharmaceutically acceptable acid addition salts thereof.

The compounds of Formula I in which $R^1$ is hydrogen are prepared in accordance with the following reaction scheme:

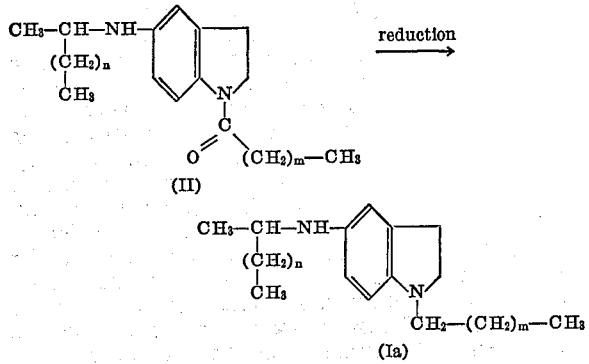

where $m$ and $n$ are as defined above.

The compounds of Formula Ia are prepared by reducing the compounds of Formula II in an inert non-hydroxylic solvent with a metal hydride reducing agent. The particular hydride used is not critical and include lithium aluminum hydride, sodium aluminum hydride, diisobutyl aluminum hydride, diborane and the like. The preferred reducing agent is diborane. The non-hydroxylic solvents include hydrocarbon solvents such as hexane, pentane, benzene, toluene and the like and ethers, such as tetrahydrofuran, diethyl ether etc. Although the particular solvent used is not critical, the preferred solvent is tetrahydrofuran or diethyl ether. The temperature at which the reaction is carried out is not critical, but the preferred temperature range is 10° to 80° C. and in particular, 20° to 40° C. The product is recovered by conventional methods, e.g., by destroying the residual reducing agent with dilute mineral acid and isolating the product by evaporation and extraction.

The compound of Formula I may be prepared according to the following reaction scheme:

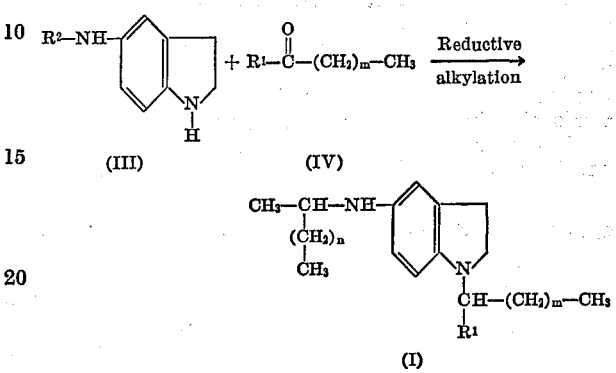

where $R^2$ represents hydrogen or $$-\overset{CH_3}{\underset{|}{CH}}-(CH_2)_n-CH_3$$

and $m$, $n$, and $R^1$ are as defined above, provided that when $R^2$ is hydrogen; $R^1$ is methyl.

The compound (1b) is prepared by the reductive alkylation of the compound of Formula III with a compound of Formula IV. The preferred catalyst for the reductive alkylation is 5% platinum sulfide on carbon, although the particular reductive alkylation catalyst used is not critical. A solvent is not necessary in the process, but if desired, alkanes, aromatic hydrocarbons or excess reagent (III) or (IV) can be used, especially the carbonyl compound (IV). Neither the temperature nor the pressure of the hydrogen employed in the reductive alkylation is critical. It is preferred, however, that the reaction be run at temperatures between about 125° to 250° C., especially between about 150° to 200° C. The preferred pressure range is between about 200 to 1200 p.s.i., especially between about 400 to 700 p.s.i. The time of the reaction is not critical, but it is preferred that the reaction be run for 2 to 4 hours. The product is recovered by conventional techniques, e.g., extraction and recrystallization. It will be obvious that where $R^2$ is hydrogen and $R^1$ is methyl, $m$ and $n$ in the final product will be the same.

The compounds of Formula I may also be prepared according to the following reaction scheme:

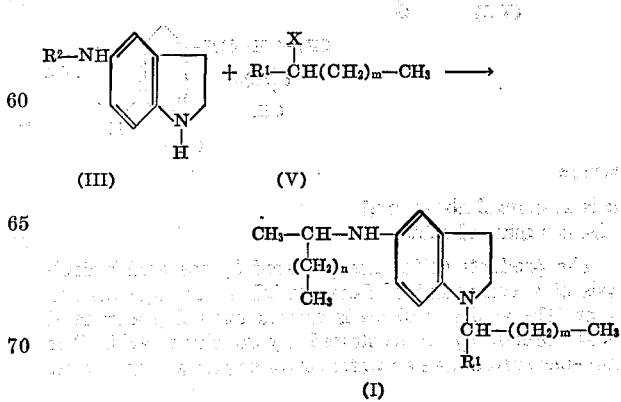

where

X is halo having an atomic weight of about 35 to 80, and m, n, R¹ and R² are as defined above, provide that when R² is hydrogen, R¹ is methyl.

The compounds of Formula I are prepared by treating a compound of Formula III with a compound of Formula V. The reaction is conveniently carried out in an inert organic solvent such as dioxane, lower alkanols, benzene or toluene, or an excess of the alkyl halide of Formula V may be used. The reaction is suitably carried out at a temperature of from 10 to 100° C., preferably 40 to 70° C. If desired, the reaction may alternately be carried out in the presence of an acid binding agent, such as a tertiary amine, e.g. triethylamine, or an inorganic base, particularly an alkali metal carbonate, e.g. sodium or potassium carbonate. The product is recovered by conventional techniques, e.g., evaporation and extraction.

The compounds of Formula II are novel and are prepared according to the following reaction scheme:

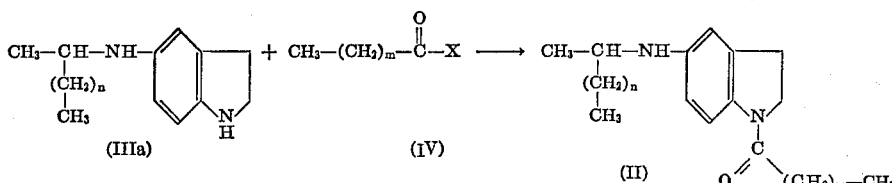

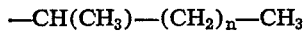

where m, n, and X are as defined above.

The products (II) are prepared by treating a compound of Formula III in which R² is

—CH(CH₃)—(CH₂)ₙ—CH₃ compound (IIIa), with a compound of Formula VI in an inert basic solvent. The compound of Formula IIIa can be used in the process in base form or in the form of an acid addition salt. The inert solvents which can be used include hydrocarbons, such as hexane, heptane, benzene, toluene, etc.; ethers, such as tetrahydrofuran and the like, excess reactants or a tertiary amine such as pyridine. The particular solvent used is not critical, but pyridine is preferred. Where one of the other solvents is used, an inorganic acid binding agent such as sodium carbonate or preferably a basic cosolvent, e.g. pyridine is added to remove the acid liberated during the reaction. Although the temperature at which the reaction is carried out is not critical, it is preferred that the reaction be run at temperatures between about 20° to 50° C., preferably 20° to 30° C. The product is recovered by conventional techniques, e.g., evaporation.

The compounds of Formula IIIa are also novel and are prepared in the form of mineral acid addition salts according to the following reaction scheme:

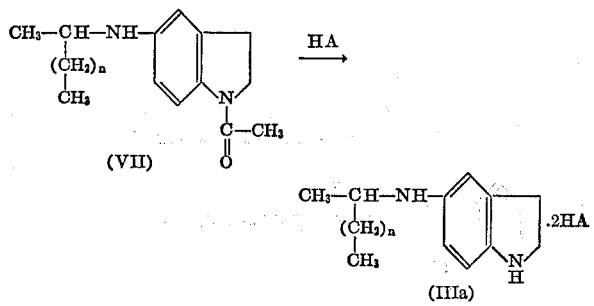

where n is as defined above, and
HA is a mineral acid.

The products (IIIa) are prepared by the acid hydrolysis of a compound of Formula VII in an aqueous solvent. The acid hydrolysis is carried out using a mineral acid, preferably concentrated hydrochloric acid. The aqueous solvent can be water or water plus an inert water soluble co-solvent, e.g., the lower alkanols. The temperature of the reaction is not critical, but it is preferred that the reaction be run at temperatures between about 50° C. to 130° C., especially between about 70° C. to 110° C. The product is recovered by conventional methods, e.g., evaporation and recrystallization.

The compounds of Formula VII are also novel and are prepared in accordance with the following reaction scheme:

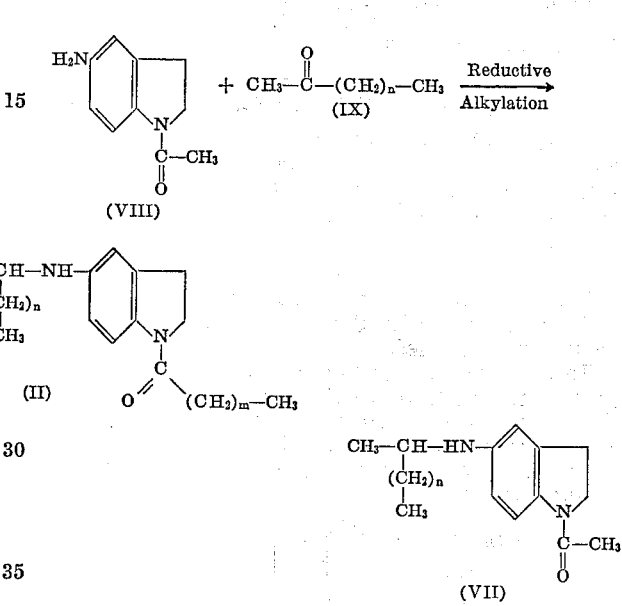

where n is as defined above.

The products (VII) are prepared by the reductive alkylation of a compound of the Formula VIII with a compound of the Formula IX. The reductive alkylation is carried out using the same reaction conditions as described above for the preparation of the compound of Formula I from compounds (III) and (IV).

The compounds of Formula III in which R² is hydrogen, (IV), (V), (VI), (VIII) and (IX) are known and can be prepared by processes described in the literature. The compound of Formula VIII, for example, can be prepared by reducing 1-acetyl-5-nitro-indoline.

The compounds of the Formula I are useful because they possess pharmacological activity in animals. More particularly, the compounds of Formula I are useful as hypolipidemic agents as indicated by the fall in cholesterol and triglyceride levels in male albino Wistar rats weighing 110–130 g. initially. The rats are maintained on drug-free laboratory chow diet for seven days and then divided into groups of 8 to 10 animals. Each group with the exception of the control is then given orally 30 milligrams per kilogram of body weight per diem of the compound for six days. At the end of this period, the animals are anesthetized with sodium hexobarbital and bled from the carotid arteries. Serum or plasma samples are collected and 1.0 ml. of the serum is added to 9.0 ml. redistilled isopropanol. Two autoanalyzer cupsful of a mixture of zeolite-copper hydroxide and Lloydds reagent (Kersler, G., and Lederer, H., 1965, Technicon Symposium, Madiad Inc., New York, 345–347) are added, and the mixture is shaken for 1 hour. Cholesterol and triglyceride levels are determined simultaneously on the same sample by Technicon N24A (cholesterol) and N–78 (triglyceride) methodology. The mean total serum cholesterol levels are then computed and the hypocholesterolemic activity is expressed as the fall in cholesterol levels as a percentage of the control level. The change in serum triglyceride levels induced by the drug is computed as a percentage of the control triglyceride levels.

The compounds 1-(2-octyl)-5-(2-octylamino)-indoline,
1-(2-heptyl)-5-(2-heptylamino)-indoline,
1-octyl-5-(2-heptylamino)-indoline,
1-nonyl-5-(2-heptylamino)-indoline,
1-(2-heptyl)-5-(2-octylamino)-indoline,
1-(2-hexyl)-5-(2-nonylamino)-indoline,
1-(2-hexyl)-5-(2-heptylamino)-indoline and
1-hexyl-5-(2-octylmino)-indoline also possess anti-obesity activity as indicated, for example, by glucose transport tests carried out on male Wistar rats which are dosed orally with 10 to 80 milligrams per kilogram of body weight of the test compound after at least 20 hours of fasting. One hour after receiving the drug, each animal is killed and the upper small intestine is removed and washed with glucose-saline. A 5 cm. section of the intestine is everted so that the mucosal surface is on the outside. One end of the segment is tied off and the center of the sac so formed, is filled with oxygen saturated Kreb's bicarbonate buffer. The other end is then closed to form a sac and the sac is incubated in 10 ml. of oxygen saturated bicarbonate buffer for 60 minutes at 37° C. Both the outside and inside solutions contain initially 0.3% of glucose. At the end of the incubation time the glucose content of the outer (mucosal) and the inner (serosal) solution is determined using the standard Autoanalyzer procedure. Similar preparations are prepared simultaneously from control animals receiving the vehicle only. The percent inhibition of glucose transport caused by the drug is calculated from the formula:

$$\text{Percent } I = 100 - \left(\frac{ST - MT}{SC - MC}\right) \times 100$$

For such usage, the compounds may be combined with one or more pharmaceutically acceptable carrier or adjuvant. Furthermore, the compounds of Formula I may be similarly administered in the form of their nontoxic pharmaceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzenesulfonate, maleate, malate, tartrate, methanesulfonate, cyclohexylsulfamate and the like.

The dosage of active ingredient employed for the alleviation of lipidemia may vary depending on the particular compound employed and the severity of the condition being treated. However, in general, satisfactory results are obtained when the compounds of Formula I are administered at a daily dosage of from about 2 milligrams to about 250 milligrams per kilogram of animal body weight, preferably given in divided doses two to four times a day, or in sustained release form. For most large mammals, the total daily dosage is from about 150 to about 1500 milligrams. Dosage forms suitable for internal use comprise from about 37.5 to about 750 milligrams of the active compound in intimate admixture with a solid or liquid pharmaceutically acceptable carrier or diluent.

Similarly the dosage of active ingredient employed for the alleviation of obesity may also vary depending on the particular compound employed and the severity of the condition being treated. However, in general, satisfactory results are obtained when the compounds of Formula I are administered at a daily dosage of from about 1 milligram to about 100 milligrams per kilogram of animal body weight, preferably given in divided doses two to four times day, or in sustained release form. For most large mammals, the total daily dosage is from about 50 to about 1000 milligrams. Dosage forms suitable for internal use comprise from about 12.5 to about 500 milligrams of the active compound in intimate admixture with a solid or liquid pharmaceutically acceptable carrier or diluent.

The preferred pharmaceutical compositions from the standpoint of preparation and ease of administration for both the hypolipidemic and antiobesity use are solid compositions, particularly hard-filled capsules and tablets containing from about 50 to 250 milligrams of the active ingredient.

A representative formulation suitable for oral administration in the treatment of lipidemia is a capsule prepared by standard encapsulating techniques which contain the following ingredients.

| Ingredients: | Weight (mg.) |
|---|---|
| 1-octyl-5-(2-octylamino)-indoline dihydrochloride | 100 |
| Inert solid diluent (starch, lactose, kaolin, etc.) | 200 |

Tablets and capsules containing the ingredients indicated below may be prepared by conventional techniques and are useful in treating obesity at a dose of one tablet or capsule 2 to 4 times a day.

| | Weight (mg.) | |
|---|---|---|
| | Tablet | Capsule |
| Ingredient: | | |
| 1-(2-octyl)-5-(2-octylamino)-indoline dihydrochloride | 100 | 100 |
| Tragacanth | 10 | |
| Lactose | 147.5 | 200 |
| Corn starch | 25 | |
| Talcum | 15 | |
| Magnesium stearate | 2.5 | |
| Total | 300 | 300 |

The following pharmaceutical compositions are formulated with the indicated amount of active agent using conventional techniques. The injectable suspension and the oral liquid suspension represent formulations useful as unit doses and may be administered in the treatment of obesity. The injectable suspension is suitable for administration once or twice a day whereas the oral liquid suspension is suitably administered 2 to 4 times per day for this purpose.

| | Weight (mg.) | |
|---|---|---|
| | Sterile—Injectable suspension | Oral—Liquid suspension |
| Ingredients: | | |
| 1-(2-heptyl)-5-(2-heptyl)-indoline dihydrochloride | 50 | 50 |
| Sodium carboxy methyl cellulose USP | 1.25 | 12.5 |
| Methyl cellulose | 0.4 | |
| Polyvinylpyrrolidone | 5 | |
| Lecithin | 3 | |
| Benzyl alcohol | 0.01 | |
| Magnesium aluminum silicate | | 47.5 |
| Flavor | | Q.s. |
| Color | | Q.s. |
| Methyl paraben, U.S.P | | 4.5 |
| Propyl paraben, U.S.P | | 1.0 |
| Polysorbate 80 (e.g. Tween 80), U.S.P | | 5 |
| Sorbitol solution, 70% U.S.P | | 2,500 |
| Buffer agent to adjust pH for desired stability | Q.s. | Q.s. |
| Water | (1) | (2) |

[1] For injection—quantity sufficient to 1 ml.
[2] Quantity sufficient to 5 ml.

EXAMPLE 1

1-octyl-5-(2-octylamino)-indoline dihydrochloride

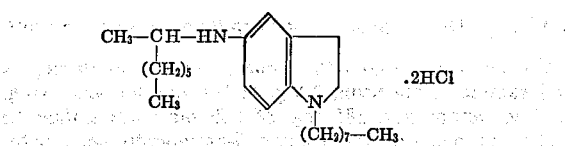

Step A: 1-acetyl-5-(2-octylamino)-indoline.—A mixture of 1-acetyl-5-nitroindoline (48 g.), 10% palladium on carbon (12 g.) and ethanol (1000 ml.) is shaken under 1 atmosphere of hydrogen in a Paar apparatus for 4 hours. The reaction mixture is filtered thru Celite and the filtrate evaporated in vacuo.

Crystallization of the residue from methylene chloride-pentane (1:8) yields 1-acetyl-5-aminoindoline (M.P.178–181° C.).

A mixture of 1-acetyl-5-aminoindoline (34.0 g.), 2-octanone (28.2 g.), and 5% platinum sulfide on carbon catalyst (0.7 g.) is placed in a bomb and shaken under an atmosphere of hydrogen (545 p.s.i.) at approximately 175° C. for 4 hours. The cooled reaction mixture is treated with methylenedichloride (800 ml.) and filtered through Celite. The filtrate is concentrated in vacuo to 100 ml. and diluted with 400 ml. pentane. The resultant crystals are collected by filtration to yield the product 1-acetyl-5-(2-octylamino)-indoline (M.P. 129–132° C.).

Step B: 5-(2-octylamino)-indoline dihydrochloride.— A mixture of 1-acetyl-5-(2-octylamino)-indoline 32 g.) and concentrated hydrochloric acid (180 ml.) is heated at 90° C. for 18 hours. The reaction mixture is evaporated to dryness in vacuo and is crystallized from methanol-acetone (1:10) to give 5-(2-octylamino)-indoline dihydrochloride (M.P. 202–204° C.).

Step C: 1-octanoyl-5-(2-octylamino)-indoline.—A mixture of 5-(2-octylamino)-indoline dihydrochloride (50.0 g.), octanoylchloride (38.2 g.) and pyridine (200 ml.) is stirred for 18 hours. The reaction mixture is treated with water (50 ml.) and after 30 minutes an additional 200 ml. of water and 400 ml. ether is added. The ether layer is separated, washed with water (1200 ml.), dried over sodium sulfate and evaporated in vacuo. A mixture of the residue and ether is treated with HCl gas and yields 1-octanoyl - 5 - (2 - octylamino) - indoline hydrochloride (M.P. 184°–186° C.). This compound is treated with 2 N Na$_2$CO$_3$ solution to give the crystalline free base, 1-octanoyl-5-(2-octylamino)-indoline (M.P. 64°–66° C.).

When an equivalent amount of nonanoyl chloride or decanoyl chloride is used in place of octanoyl chloride in the above process there is obtained the hydrochloride salt of 1-nonanoyl - 5 - (2-octylamino)-indoline (M.P. 191–193° C.) or 1-decanoyl-5-(2-octylamino) indoline respectively.

Step D: 1-octyl - 5 - (2 - octylamino)indoline dihydrochloride.—A solution of 1-octanoyl - 5 - (2-octylamino)-indoline (4.0 g.) in tetrahydrofuran (100 ml.) is added dropwise over a 10 minute period to a stirred solution of diborane (24 ml. of 0.025 M solution) in tetrahydrofuran.

After stirring for 20 hours at room temperature, 3.7 ml. of 0.1 N hydrochloric acid is added and the resultant mixture is refluxed for 2 hours. The reaction mixture is evaporated in vacuo and the residue treated with 50 ml. of water, 50 ml. of ether and 40 ml. of 2 N sodium carbonate solution. The ether layer is separated, dried over Na$_2$SO$_4$ and then treated with HCl gas. The product 1-octyl-5-(2-octylamino)-indoline dihydrochloride (M.P. 186°–188° C.) is collected by filtration.

When an equivalent amount of 1-nonanoyl-5-(2-octylamino)-indoline or 1-decanoyl-5-(2-octylamino)-indoline is used in place of the 1-octanoyl-5-(2-octylamino)-1-indoline in the above process, there is obtained the dihydrochloride salt of 1-nonyl - 5 - (2-octylamino)-indoline (M.P. 179°–181° C.) or 1-decyl - 5 - (2 - octylamino) indoline (M.P. 181°–183°) respectively.

EXAMPLE 2

1-(2-heptyl)-5-(2-heptylamino)-indoline dihydrochloride

Following essentially the same procedure as in step A of Example 1, but using 7.5 g. of 5-amino-indoline, 16 g. of 2-heptanone and 185 mg. of 5% platinum sulfide on carbon in place of the 1-acetyl-5-aminoindoline, 2-octanone and the quantity of 5% platinum on carbon used therein, and carrying out the reaction at 175°–180° C. in an autoclave under 400 p.s.i. of hydrogen pressure, there is obtained 1-(2-heptyl)-5-(2-heptylamino)-indoline as a crystalline product. The crystals are dissolved in methanol and filtered through Celite. Hydrogen chloride gas is bubbled through the solution for a short period after which the solvent is removed by evaporation. The product, 1-(2-heptyl)-5-(2-heptylamino) - indoline-dihydrochloride (M.P. 160.5–164° C.), is recrystallized from 1:1 acetone pentane.

Following the above procedure but using an equivalent amount of 2-octanone, methyl heptyl ketone or 2-decanone in place of the 2-heptanone used therein, there is obtained 1-(2-octyl)-5-(2-octylamino) - indoline dihydrochloride (M.P. 164°–167° C.), 1-(2-nonyl)-5-(2-nonylamino)-indoline dihydrochloride (M.P. 165°–170° C.) or 1-(2-decyl)-5-(2-decylamino)-indoline dihyrochloride (M.P. 159°–162° C.).

EXAMPLE 3

Following the procedures of steps C and D of Example 1, but using an equivalent amount of hexanoyl chloride or heptanoyl chloride in place of the octanoyl chloride of step C, there is obtained the dihydrochloride salt of 1-hexyl-5-(2-octaylamino)-indoline (M.P. 194°–196° C.) or 1-heptyl-5-(2-octylamino)-indoline (M.P. 196°–198° C.) respectively.

EXAMPLE 4

1-octyl-5-(2-heptylamino)-indoline dihydrochloride

Following the procedure of steps A and B of Example 1, but using an equivalent amount of 2-heptanone in place of the 2-octanone used therein, there is obtained 5-(2-heptylamino)-indoline dihydrochloride.

Using essentially the same processes set out in steps C and D of Example 1 and employing octanoyl chloride and an equivalent amount of 5-(2-heptylamino)-indoline dihydrochloride in place of the 5-(2-octylamino)-indoline-dihydrochloride, there is obtained 1-octyl-5-(2-heptylamino)-indoline dihydrochloride (M.P. 181°–184° C.).

When the above process is carried out using an equivalent amount of hexanoyl chloride, heptanoyl chloride or nanoyl chloride in place of the octanoyl chloride, there is obtained 1-hexyl-5-(2-heptylamino)-indoline dihydrochloride (M.P. 187°–193° C.); 1-heptyl-5-(2-heptylamino) indoline dihydrochloride, M.P. 190°–193° C.) or 1 - nonyl - 5 - (2-heptylamino)-indoline dihydrochloride (M.P. 181°–186° C.).

EXAMPLE 5

1-octyl-5-(2-nonylamino)-indoline dihydrochloride

Following the procedure of steps A and B of Example 1, but using an equivalent amount of methyl heptyl ketone in place of the 2-octanone used therein, there is obtained 5-(2-nonylamino)indoline dihydrochloride.

Using essentially the same processes set out in steps C and D of Example 1 and employing octanoyl chloride and an equivalent amount of 5-(2-nonylamino)-indoline dihydrochloride in place of the 5-(2-octylamino)indoline dihydrochloride, there is obtained 1-octyl-5-(2-nonylamino)-indoline dihydrochloride (M.P. 189°–192° C.).

When the above process is carried out using an equivalent amount of hexanoylchloride, heptnaoyl chloride or nanoyl chloride in place of the octanoyl chloride, there is obtained 1-hexyl-5-(2-nonylamino)-indoline dihydrochloride (M.P. 188°–190° C.); 2-heptyl-5-(2-nonylamino) indoline dihydrochloride (M.P. 192°–194° C.) or 1-nonyl - 5 - (2 - nonylamino)-indoline dihydrochloride (M.P. 185°–188° C.).

EXAMPLE 6

1-octyl-5-(2-octylamino)-indoline dihydrochloride

A mixture of 50 g. of 5-(2-octylamino)-indoline dihydrochloride, 50 g. of octyl bromide, 200 ml. of 2 N sodium carbonate and 1 liter of ethanol is stirred for 18 hours at 60° C. The reaction mixture is treated with 1 liter of water and extracted with 1 liter of ether. The ether layer is separated, washed with 1200 ml. of water, dried over sodium sulfate and evaporated in vacuo. A mixture of the residue and ether is treated with HCl gas to yield 1-octyl-5-(2-octylamino)-indoline hydrochloride (M.P. 186°–188° C.).

When an equivalent amount of nonyl bromide or decyl bromide is used in place of octyl bromide in the above process there is obtained the hydrochloride salt of 1-nonyl-5-(2-octylamino)-indoline, and 1-decyl-5-(2-octylamino)indoline respectively.

EXAMPLE 7

1-(2-octyl)-5-(2-octylamino)-indoline dihydrochloride

Following essentially the same procedure as in Example 6 but using 50 g. of 5-amino-indoline and 100 g. of 2-octyl bromide in place of the 5-(2-octylamino)indoline and octyl bromide and carrying out the reaction at 70° C., there is obtained 1-(2-octyl)-5-(2-octylamino)-indoline dihydrochloride.

When the above procedure is carried out using an equivalent amount of 2-heptyl bromide in place of the 2-octyl bromide used therein, there is obtained 1-(2-heptyl)-5-(2-heptylamino)-indoline dihydrochloride.

What is claimed is:

1. A compound of the formula

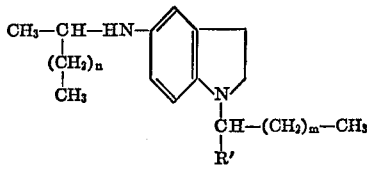

where $m$ and $n$ are independently 4, 5, 6, 7, or 8, and $R^1$ represents hydrogen or methyl, or a pharmaceutically acceptable acid addition salt thereof.

2. The compound of claim 1 which is 1-octyl-5-(2-octylamino)-indoline.

3. The compound of claim 1 which is 1-nonyl-5-(2-octylamino)-indoline.

4. The compound of claim 1 which is 1-nonyl-5-(2-heptylamino)-indoline.

5. The compound of claim 1 which is 1-(2-heptyl)-5-(2-heptyl-amino)-indoline.

6. The compound of claim 1 which is 1-(2-octyl)-5-(2-octylamino)-indoline.

7. The compound of claim 1 which is 1-(2-nonyl)-5-(2-nonylamino)-indoline.

8. A compound of the formula

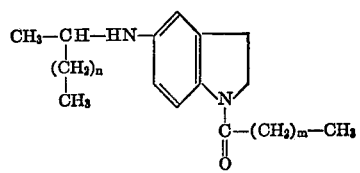

where $m$ and $n$ are as defined in claim 1.

9. The compound of claim 8 which is 1-octanoyl-5-(2-octylamino)-indoline.

10. The compound of claim 8 which is 1-nonanoyl-5-(2-octylamino)-indoline.

11. A compound of the formula

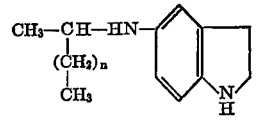

where $n$ is as defined in claim 1, or a mineral acid addition salt thereof.

12. The compound of claim 8 which is 5-(2-octylamino)-indoline dihydrochloride.

13. A compound of the formula

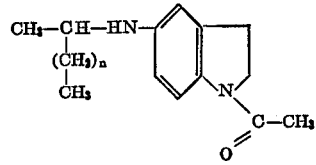

where $n$ is as defined in claim 1.

14. The compound of claim 10 which is 1-acetyl-5-(2-octylamino)-indoline.

References Cited

UNITED STATES PATENTS 3,635,956   1/1972   Krapcho _____ 260—240

JOSEPH A. NARCAVAGE, Primary Examiner

U.S. Cl. X.R.

424—274